United States Patent [19]

Becker

[11] Patent Number: 4,522,637
[45] Date of Patent: Jun. 11, 1985

[54] INTEGRATED ADSORPTION SYSTEM FOR THE PURIFICATION OF SEPARATE CRUDE GASES

[75] Inventor: Hans Becker, Munich, Fed. Rep. of Germany

[73] Assignee: Linde Aktiengesellschaft, Wiesbaden, Fed. Rep. of Germany

[21] Appl. No.: 556,476

[22] Filed: Nov. 30, 1983

[30] Foreign Application Priority Data

Nov. 30, 1982 [DE] Fed. Rep. of Germany ....... 3244304

[51] Int. Cl.³ ............................................. B01D 53/04
[52] U.S. Cl. ......................................... 55/25; 55/33; 55/68; 55/74
[58] Field of Search .................. 55/25, 26, 31, 33, 35, 55/58, 62, 68, 74, 75, 179, 180, 387, 389

[56] References Cited

U.S. PATENT DOCUMENTS

| | | | |
|---|---|---|---|
| 2,747,681 | 5/1956 | Schuftan et al. | 55/62 X |
| 2,918,140 | 12/1959 | Brooks | 55/62 X |
| 3,085,379 | 4/1963 | Kiyonaga et al. | 55/62 X |
| 3,086,339 | 4/1963 | Skarstrom et al. | 55/26 |
| 3,252,268 | 5/1966 | Stark | 55/25 |
| 3,619,984 | 11/1971 | Domine et al. | 55/25 |
| 3,893,827 | 7/1975 | Leppard | 55/25 |
| 4,171,206 | 10/1979 | Sircar | 55/26 |
| 4,280,824 | 7/1981 | Lassmann et al. | 55/62 X |
| 4,402,712 | 9/1983 | Benkmann | 55/26 |

Primary Examiner—Robert Spitzer
Attorney, Agent, or Firm—Millen & White

[57] ABSTRACT

An adsorption installation is employed for the purification of several crude gas streams. The individual crude gas streams are conducted separately from one another through the adsorbers in cyclic alternation. Preferably, an adsorber is regenerated only after all crude gas streams have been passed through the adsorber. The number of adsorbers utilized can be kept lower than in the separate purification of each individual crude gas stream.

12 Claims, 3 Drawing Figures

| ADS 1 | DES | ADS 2 | DES | ADS 3 | DES |
|---|---|---|---|---|---|
| DES | ADS 1 | DES | ADS 2 | DES | ADS 3 |
| ADS 3 | DES | ADS 1 | DES | ADS 2 | DES |
| DES | ADS 3 | DES | ADS 1 | DES | ADS 2 |
| ADS 2 | DES | ADS 3 | DES | ADS 1 | DES |
| DES | ADS 2 | DES | ADS 3 | DES | ADS 1 |
| 1 | 2 | 3 | 4 | 5 | 6 |

# INTEGRATED ADSORPTION SYSTEM FOR THE PURIFICATION OF SEPARATE CRUDE GASES

BACKGROUND OF THE INVENTION

This invention relates to a process for the adsorptive purification of contaminated crude gas streams in a facility containing several cyclically reversible adsorbers wherein each adsorber passes through switching cycles comprising at least one adsorption phase and one desorption phase.

Gas purification processes of this type are widely known, the crude gas stream being purified conventionally in facilities comprising at least two adsorbers. To provide continuous operation, at least one adsorber in all cases is operated in an adsorption phase while in parallel thereto at least one other adsorber is freed of the contaminants adsorbed in a preceding phase. Regeneration of loaded adsorbers can be effected in various ways, for example by pressure swing, passing scavenging gases through the adsorber, heating, or a combination of these measures.

A process of this type is known from DAS No. 2,064,137 wherein regeneration of two alternatingly operated adsorbers is accomplished by passing a hot scavenging gas therethrough. The process is particularly intended for the drying of gaseous streams containing water molecules. An English Lauguage counterpart to DAS No. 2,064,137 is U.S. Pat. No. 3,808,773.

If several crude gas streams are to be purified simultaneously, separate adsorption facilities are usually required for this purpose, specifically whenever the crude gas streams must not be combined and worked up together. Then, the initial investment cost for the erection of separate adsorption installations for separate crude gases is unusually high as compared to a single facility having the same throughput capacity.

SUMMARY

Therefore, an object of the invention is to provide a simplified process of the type discussed above for the processing of several separately treatable crude gas streams in an economically constructed adsorption facility.

Upon further study of the specification and appended claims, other objects and advantages of the invention will become apparent.

These objects are attained by providing an arrangement wherein several crude gas streams can be purified separately from one another in one adsorption facility with the provision that the number of adsorbers is larger by at least one than the number of crude gas streams, and that the crude gas streams are passed in alternating cycles through the adsorbers.

In the process of this invention, the adsorbers are successively charged with different crude gas streams. Even though, in a first, simplified embodiment of the invention, it is advisable to retain the total number of adsorbers, as compared to separate adsorption installations, the operating process of the invention offers advantages. For example, in the case where a corresponding requirement is to be met by the pure gases, it is possible to moderate the process conditions during the desorption phase in the successive purification of several crude gas streams with respectively interposed desorption phases. More specifically, 3 crude gas streams A, B, C are purified in succession, and these gas streams contain components a, b, c, each being deleterious in the respective pure gas; however, certain amounts of c are tolerable in pure gas A, certain amounts of a are tolerable in pure gas B, and certain amounts of b are tolerable in pure gas C. Accordingly, in such cases, a residual charge of the components respectively adsorbed from the preceding crude gas can remain in the adsorber during the desorption phase. These residual amounts are then absorbed, in the subsequent adsorption phase, by a crude gas stream wherein they pose no interference in the pure gas.

Although it is possible within the scope of the process of this invention for the adsorbers to pass through a smaller number of adsorption phases than the number of crude gas streams present (for example, if not all crude gas streams are conducted through all adsorbers), it is nevertheless advantageous in many instances to adapt the number of adsorption phases to the number of crude gas streams. In this case, each crude gas stream is preferably conducted through each adsorber.

In an especially advantageous embodiment of the invention, the adsorbers are charged successively with all crude gas streams before being switched over to a desorption phase. In this operating embodiment, a progressive loading of the adsorber with adsorbable components takes place. Consequently, since no desorption phases are interposed between the individual adsorption phases, in this procedure only those gaseous streams can be purified which, due to their composition and/or their impurities, are of such kind that no undesirable contaminants are introduced into individual gaseous streams by the successive purification stages. This type of operation is especially advantageous in the purification of several gaseous streams of similar composition and similar or identical contaminants, but where the gaseous streams are not to be directly mixed together on account of certain marginal conditions present. Such reasons can be, for example, different concentrations of certain gaseous components, different crude gas pressures, different purity requirements, etc. In this embodiment of the process of the present invention, important is the sequence in which the crude gas streams are passed through the adsorbers. If there is a requirement for gases of different purities, then, following a desorption phase, the crude gas stream required to yield the purest gas should first be passed through the completely desorbed adsorber, followed by crude gases having lower ultimate purity requirements. In contrast, if constant purity is demanded, it is advantageous to conduct the crude gas stream having the highest partial pressure of the component or components to be adsorbed as the last one through the adsorbers before a desorption phase.

If several crude gas streams are passed through an adsorber between two desorption phases of this adsorber, then the individual adsorption phases are to be adapted to each other in such a way that the adsorbers are completely loaded, if at all, only after termination of the final adsorption phase. In other words, the individual crude gas streams must not be conducted through the adsorbers for such a long period that the adsorbers become saturated before all the crude streams can be subject to adsorption. Since varying adsorption velocities are present during the individual adsorption phases, especially when purifying crude gases having different concentrations of impurities, it is advantageous to switch the adsorbers on the basis of a constant cycle time from one crude gas stream to the next one and/or to the desorption phase. This type of operation is simpler in many cases than a possible switchover dependent on specific, predetermined load conditions of the adsorbers, which would lead to nonuniformly long adsorption cycles and would require expensive process equipment.

In the purification of crude gas streams of different pressures, it is in most cases advantageous to switch the streams to the adsorbers in a sequence of increasing pressures. In this way, it is possible to keep the time periods and gas quantities required for pressure buildup at a low value. Besides, insofar as additional switching means are required for this purpose, said means can be utilized by recovering the expansion gas by stepwise pressure reduction after the last adsorption phase, at the respectively next-lower pressure level.

It is possible to conduct the desorption of the loaded adsorbers in any desired conventional manner, for example, by lowering the pressure, by heating the adsorbent, by passing cold or heated regenerating gases therethrough, by displacement of the adsorbed components by a more readily adsorbable gas, or by a combination of these conventional process steps. If the contaminants to be separated from the crude gases are present in such low concentration that relatively long adsorption cycles, for example, on the order of hours or days are required for the individual adsorbers, then thermal desorption methods are especially suitable.

An important advantage of a preferred aspect of the process of this invention is to be seen in that the number of adsorbers required for the purification of n crude gas streams is not at least 2n adsorbers, as is the case in conventional processes conducted separately from one another, but instead, in the present invention, the number is merely n+1 adsorbers. A preferred apparatus for conducting the process of this invention is, therefore, distinguished by n+1 adsorbers respectively provided, at their inlet sides, by way of switching valves, with n crude gas feed conduits and, at their outlet sides, by way of switching valves, with n pure gas discharge conduits. Furthermore, the preferred apparatus comprises a regenerating gas conduit connected to the outlet ends of the adsorbers by way of switching valves and a discharge conduit for desorbate-containing regenerating gas connected to the inlet ends of the adsorbers by way of switching valves, as well as a control unit for the cyclic switching of the valves.

The process of this invention is suitable, for example, for drying or for the separation of carbon dioxide from various crude gases. In addition, the process is also suitable for other separating processes wherein certain components are to be separated from gases, for example, hydrogen sulfide or other sulfur compounds or hydrocarbons from hydrogen-rich gases.

DETAILED DESCRIPTION OF FIGURES

Figure 1:
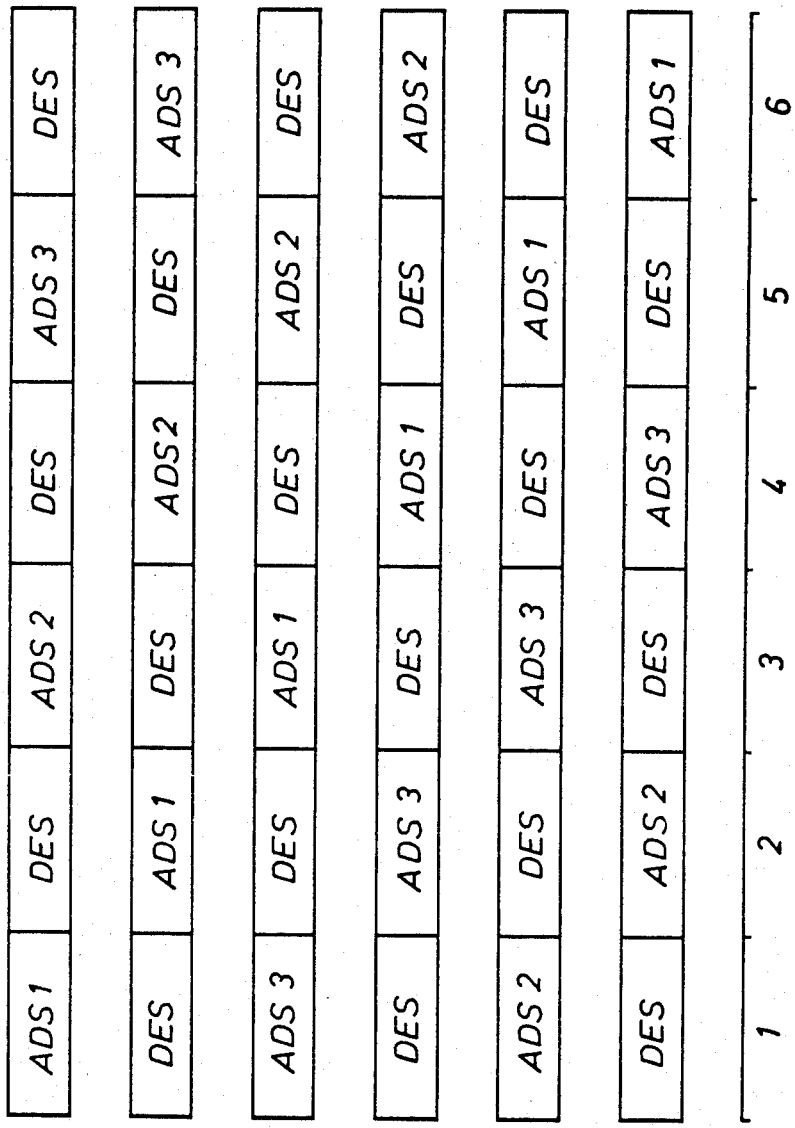
FIG. 1 is a cycle schedule for a first, simple preferred embodiment of the invention.

In FIG. 1, the cycle schedule is illustrated for an adsorption facility consisting of six adsorbers and used for the purification of three crude gas streams. Each of the six horizontal bars corresponds to a complete adsorption cycle of one adsorber, traversed in six equally long cyclic steps. During the first stage of the cycle, the adsorber designated by the uppermost bar is charged with the first crude gas stream, and in this adsorber the adsorption phase ADS 1 is conducted. Following the first stage, a desorption phase DES is conducted in the second stage of the cycle, during which at least the largest portion of the components adsorbed during phase ADS 1 is removed from the adsorber. Then, in the third stage of the cycle, a second adsorption phase ADS 2 is conducted, during which the adsorber is charged with the second crude gas stream. Residual contaminants separated from the first crude gas stream that have still remained in the adsorber during the preceding desorption phase are flushed out of the adsorber by the second crude gas stream; this reduces the requirements to be met by the preceding desorption phase. Following the second adsorption phase, the adsorber is again desorbed in a fourth stage of the cycle and is thereafter charged, in a fifth stage of the cycle, with the third crude gas stream during adsorption phase ADS 3. After a third desorption phase, a cycle has been completed, and charging with the first crude gas stream is again carried out. The remaining adsorbers traverse the same switching stages of the cycle with chronologically shifted sequence so that continuous discharge of the three purified gaseous streams is made possible.

Figure 2:
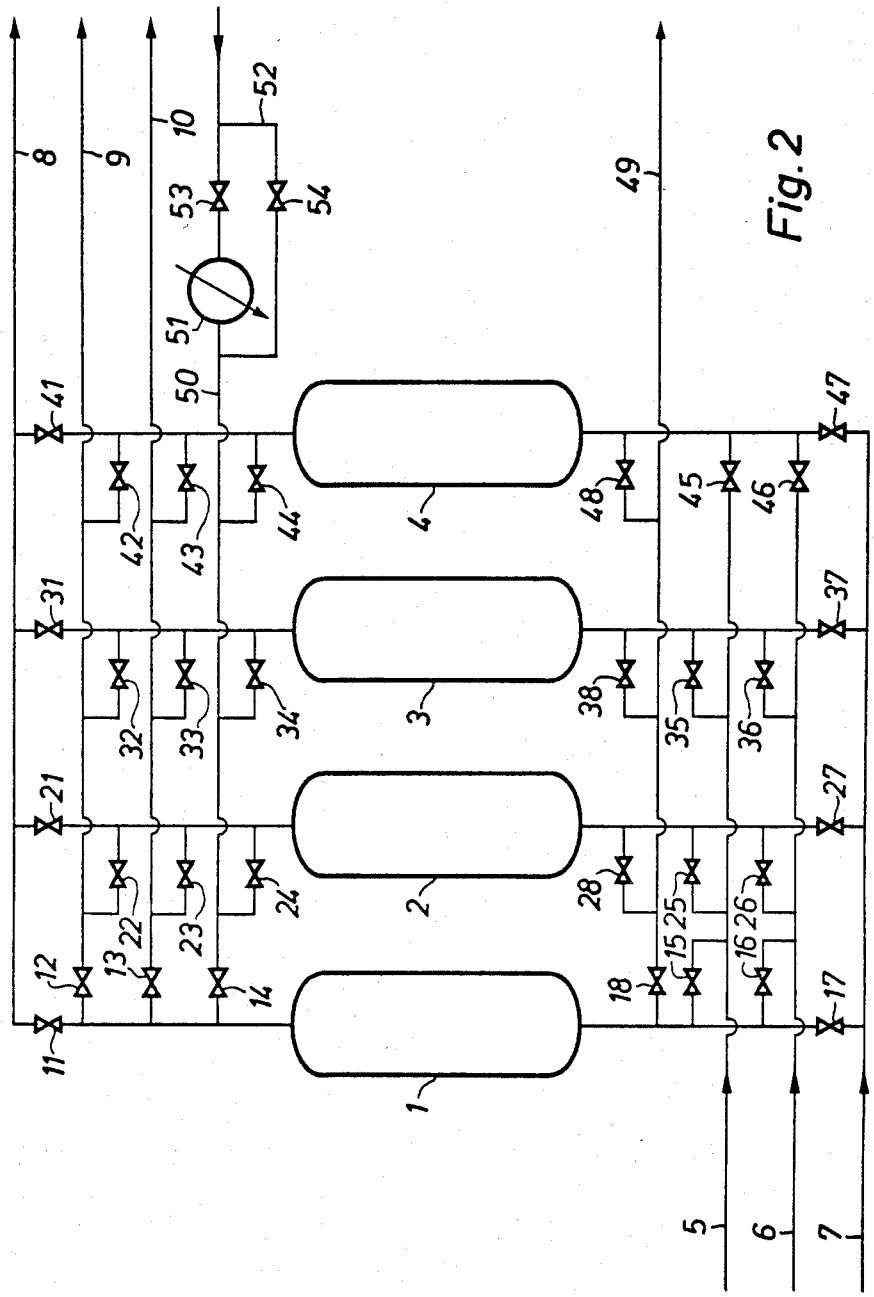
FIG. 2 is a schematic flowsheet of preferred switching system for an adsorption facility according to the invention.

FIG. 2 illustrates an adsorption installation for the purification of three crude gas streams 5, 6, 7, consisting of four adsorbers 1, 2, 3, 4. The outlet ends of the adsorbers are connected via conduits to conventional automatically controlled valves indicated by two-digit numbers, the first digit being the adsorber identification and the second number being a certain function. Valves 11, 12, 13, and 14 are associated with adsorber 1. On the inlet side, the adsorbers are connected via conduits to valves associated with the adsorbers in the same way. These are valves 15, 16, 17, and 18 for adsorber 1. The purified gases are withdrawn via conduits 8, 9, and 10, connected via the valves to the outlet sides of the adsorbers. Furthermore, a conduit 49 is provided for the discharging of desorption gas, and a conduit 50 is included for feeding regenerating gas during a desorption phase. A heat exchanger 51 can be wholly or partially circumvented by bypass conduit 52; valves 53 and 54 are provided for regulating the individual partial streams.

During operation of the adsorption installation, the adsorber 1 passes through a switching cycle wherein, in a first stage of the cycle, the inlet end of the adsorber is in communication with the crude gas conduit 5 by way of opened valve 15. The valves 16, 17, and 18 arranged on the inlet side are closed. The crude gas from conduit 5 flows through the adsorber 1 wherein the components to be separated are adsorbed, and the purified gas exits from the adsorbimer outlet end and passes through the opened valve 11 into the pure gas conduit 8. The valves 12, 13, and 14 connected to the adsorber outlet end are closed during this phase. After a predetermined loading time, during which the adsorber 1 is not as yet entirely loaded, valves 15 and 11 are closed and valves 16 and 12 are opened. At this point, the second crude gas stream fed via conduit 6 enters the adsorber 1 and passes as purified gaseous stream into the pure gas conduit 9 via the opened valve 12. Also, this loading phase with the second crude gas stream is interrupted after a predetermined time period, so that the adsorber 1 still is not entirely loaded. After closing valves 12 and 16, valves 13 and 17 are opened so that at this point the third crude gas stream conducted via conduit 7 is passed through the adsorber 1 and withdrawn as a purified gaseous stream via conduit 10. This third adsorption phase again is carried out during a predetermined time period and thereafter terminated by closing valves 13 and 17. The individual adsorption phases are adapted to one another in such a way that the adsorber 1, after conclusion of the third adsorption phase, is essentially fully loaded.

The fully loaded adsorber is thereupon countercurrently traversed by a regenerating gas in conduit 50 by opening valves 14 and 18. The regenerating gas upstream of conduit 14 is first conducted through the opened valve 53 and the heat exchanger 51 and heated during this step to such an extent that an increased temperature favorable for regeneration prevails in adsorber 1. The regenerating gas loaded with desorbed components is then withdrawn from the installation via conduit 49. After the desorbed components have been removed from adsorber 1, valve 53 is closed while valve 54 is opened. At this point, cold regenerating gas flows through the adsorber so as to cool the latter from the regenerating temperature to the adsorption temperature. After the adsorption temperature has been reached, the valves 14 and 18 are closed while valves 15 and 11 are reopened so that the cycle can be repeated.

The same cycle is repeated out of phase in adsorbers 2, 3, and 4. The time shift is selected to be such that the three crude gas streams are continuously purified. For this purpose, the chronological displacement of the switching cycles of the individual adsorbers is so selected that, after conclusion of the adsorption phase for the first crude gas stream from conduit 5 in adsorber 1, i.e., after closing of valves 15 and 11, this crude gas stream is passed via valves 25 and 21 through the adsorber 2. After termination of the adsorption phase in this adsorber, this crude gas stream is correspondingly passed through the then-opened valves 35 and 31 through adsorber 3 and finally, in a fourth cycle step, through the then-opened valves 45 and 41 through adsorber 4. At the end of the adsorption phase in adsorber 4, the switching cycle is completed so that the crude gas stream from conduit 5 is again introduced into the first adsorber. Although not specifically mentioned, the function of valves 22, 32, 23, 33, 24, 34, 44, 26, 36, 27, 37, 28, 38, and 48 are apparent from the Figure.

Figure 3:
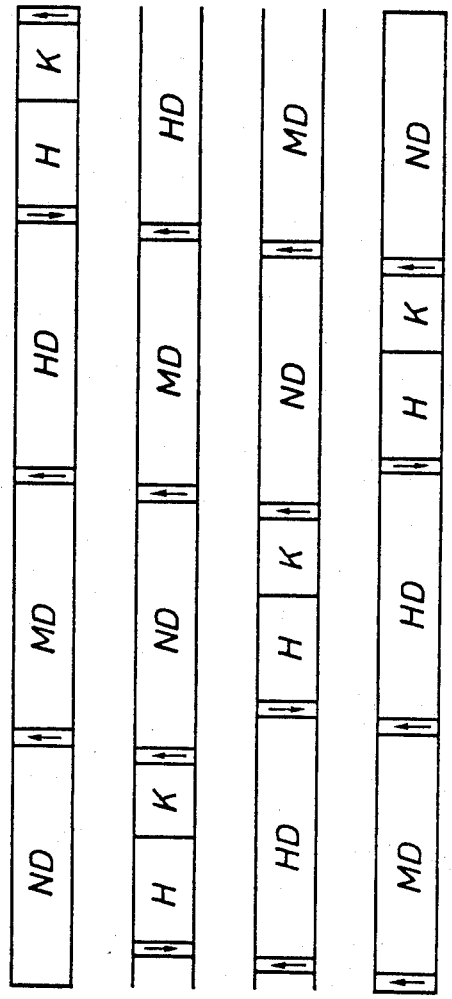
FIG. 3 is a cycle schedule for a second preferred embodiment of the invention which can be conducted with the installation illustrated in FIG. 2.

FIG. 3 is a cycle schedule demonstrating how crude gas streams under different pressures can be purified in an adsorption installation according to FIG. 2. It is assumed in this example that the crude gas streams consist essentially of the same components, but wherein the proportions of the components may be different. Such multi-pressure level purification problems can occur, for example, in high-pressure hydrogenation systems wherein impure unconsumed hydrogen fractions are obtained under high, intermediate, and low pressures and are to be recycled into the hydrogenation process after purification and optionally recompression. As compared with the operation described in connection with FIG. 2, the individual adsorption stages must here be conducted under different pressures, since the pressure level of each individual raw recycle hydrogen stream is to be maintained. To achieve this, short pressure-increasing and pressure-lowering phases, respectively, are interspersed between the individual adsorption phases, the length of the latter phases being usually about 30 minutes to 30 hours. It is assumed that the low-pressure stream is fed via conduit 5, the intermediate-pressure stream is fed via conduit 6, and the high-pressure stream is fed via conduit 7 into the adsorption installation according to FIG. 2. The switching cycle of adsorber 1, illustrated by the uppermost bar of FIG. 3, first passes through a low-pressure adsorption phase ND during which valves 15 and 11 are open. After conclusion of the adsorption phase ND, valves 15 and 11 are closed and valve 16 is opened. Thereby, intermediate-pressure gas fed via conduit 6 flows into adsorber 1 and raises the latter from low pressure to intermediate pressure (in FIG. 3, pressure-raising phases are indicated by an upwardly pointing arrow and pressure-lowering phases by a downwardly pointing arrow).

In parallel to raising the pressure in adsorber 1 to the intermediate pressure via the opened valve 16, intermediate-pressure gas is purified in adsorber 4 through the opened valves 46 and 42. After termination of the pressure-raising phase 1, the adsorption phase in adsorber 4 is concluded, and valves 46 and 42 are closed. The adsorption phase for the intermediate-pressure stream is then taken over by adsorber 1, for which purpose the valve 16 remains open and valve 12 is opened. After termination of the adsorption phase MD for the intermediate-pressure stream, valves 16 and 12 are closed and adsorber 1 is raised to the higher process pressure by opening valve 17. During this phase, the last part of an adsorption phase for the high-pressure stream is conducted in absorber 4. After conclusion of the pressure-raising phase for adsorber 1, the adsorption phase in adsorber 4 is terminated by closing valves 47 and 43, and the high-pressure stream enters adsorber 1 via the now-opened valve 13.

After completion of the high-pressure adsorption phase HD, adsorber 1 is completely loaded and must be regenerated. For this purpose, with valves 17 and 13 being closed at this point, lowering of the pressure to the regenerating pressure is initiated via the valve 18 and via conduit 49. After the regenerating pressure has been attained, this being the lowest process pressure, valve 14 is opened, and heated regenerating gas is passed through the adsorber to perform desorption phase H. Following the desorption of the previously adsorbed components, the adsorber is recooled during a cooling phase K to the adsorption temperature. After reaching the adsorption temperature, valves 14 and 18 are closed and the adsorber is raised first to the pressure of the low-pressure stream by opening valve 15, before a new adsorption cycle is initiated by opening valve 11.

In order to discharge all three purified gaseous streams continuously in this embodiment of the invention, the time for each individual adsorption phase is predetermined to account for one-fourth of the total duration of a switching cycle. Another one-fourth is occupied by the regenerating phase and the pressure-raising and pressure-lowering phases, respectively, interposed between the individual adsorption phases.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a gas adsorption process for the purification of contaminated crude gas streams in an adsorption facility containing a plurality of cyclically reversible adsorbers wherein each cycle of an adsorber comprises at least one adsorption phase and one desorption phase, the improvement comprising conducting said adsorption of several crude gas streams separately from one another in a single adsorption facility having a number of adsorbers larger by at least one than the number of crude gas streams; and passing the crude gas streams in cyclic alternation through the adsorbers with the provision that each adsorber is passed through a number of adsorption phases equal to the total number of said several crude gas streams wherein each adsorber is cyclically charged with all of said crude gas streams.

2. A process according to claim 1, wherein the number of adsorbers is only one more than the number of crude gas streams.

3. A process according to claim 2 comprising three crude gas streams and only four adsorbers.

4. A process according to claim 1, said adsorbers being reversed on the basis of a constant cycle time.

5. A process according to claim 1, comprising conducting desportion of the adsorbed impurities thermally.

6. A process according to claim 5, said desorption being conducted with a hot regenerating gas.

7. A process according to claim 1, said separate crude gas streams being under different pressures, and passing said different pressure crude gas streams through the adsorbers respectively under said different pressure.

8. A process according to claim 1, wherein water molecules are removed from the crude gas stream during the adsorption step, thereby drying each of said gases.

9. In a gas adsorption process for the purification of contaminated crude gas streams in an adsorption facility containing a plurality of cyclically reversible adsorbers wherein each cycle of an adsorber comprises at least one adsorption phase and one desorption phase, the improvement comprising conducting said adsorption of several crude gas streams separately from one another in a single adsorption facility having a number of adsorbers larger by one than the number of crude gas streams; and passing the crude gas streams in cyclic alternation through the adsorbers with the provision that each adsorber is charged cyclically with all of said crude gas streams.

10. A process according to claim 9 wherein the number of adsorbers is four and the number of crude gas streams is three.

11. In a gas adsorption process for the purification of contaminated crude gas streams in an adsorption facility containing a plurality of cyclically reversible adsorbers wherein each cycle of an adsorber comprises at least one adsorption phase and one desorption phase, the improvement comprising conducting said adsorption of several crude gas streams separately from one another in a single adsorption facility having a number of adsorbers larger by at least one than the number of crude gas streams; and passing the crude gas streams in cyclic alternation through the adsorbers and wherein each adsorber is charged successively with all crude gas streams before being switched over to a desorption phase, each adsorber being passed through a number of adsorption phases equal to the number of crude gas streams.

12. A process according to claim 11 wherein the crude gas stream having the highest partial pressure of contaminant gas to be adsorbed is passed on as the last in the succession of crude gas streams through each adsorber prior to said adsorber being switched over to desorption.

* * * * *